J. NEGRESCOU.
CLUTCH.
APPLICATION FILED APR. 22, 1918.

1,307,830.

Patented June 24, 1919.

Witness:
Leonard W. Novander

Inventor
John Negrescou
By James R. Offield
Atty

UNITED STATES PATENT OFFICE.

JOHN NEGRESCOU, OF CHICAGO, ILLINOIS.

CLUTCH.

1,307,830.      Specification of Letters Patent.     Patented June 24, 1919.

Application filed April 22, 1918. Serial No. 229,967.

*To all whom it may concern:*

Be it known that I, JOHN NEGRESCOU, a citizen of the United States, and a resident of Chicago, in the county of Cook and State of Illinois, have invented certain new and useful Improvements in Clutches, of which the following is a specification.

My invention relates to clutches, its object being to produce a simple, inexpensive clutch which can be efficiently used for selectively connecting one of a number of driven elements to a driving element.

On the accompanying drawing the various features of my invention are clearly shown. On the drawing—

Figure 1:
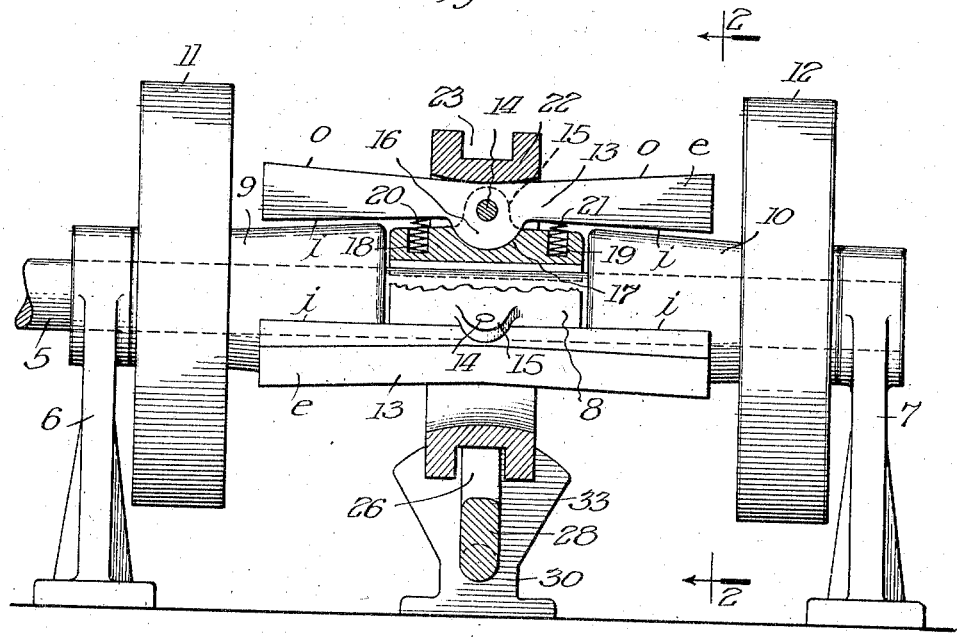
Figure 1 is a side elevational view with parts broken away.
Figure 2:
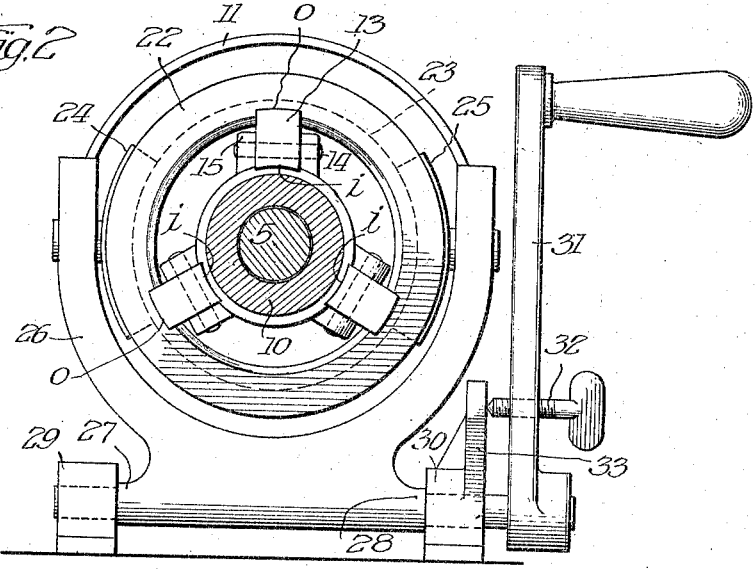
Fig. 2 is a sectional view on plane 2—2, Fig. 1.

5 represents a driving shaft journaled in bearing standards 6 and 7. To this shaft is secured by a set-screw, key, or otherwise, a clutch body or block 8 and rotatably mounted on the shaft between this clutch body and the bearing standards are the clutch hubs 9 and 10 supporting at their outer ends driving or transmission wheels 11 and 12 respectively such as belt pulleys or gears. On the body or block 8 are mounted a number of clutch levers or arms 13, three being preferably used. Each lever is pivoted intermediate its ends on a pin 14 between a pair of ears 15—15 extending from the block 8, and each lever has the substantially semi-cylindrical projection 16 whose center is the pin 14 and which bears in a semi-cylindrical pocket 17 formed in the block. Below the ends of each lever the block has sockets 18 and 19 for small compression springs 20 and 21 which bear upwardly against the lever and tend to hold it in horizontal or neutral position.

The hubs 9 and 10 are frusto-conical with their bases adjacent the block 8, and the ends of the clutch levers are of increasing radial thickness outwardly from their pivots and overlie the conical clutch hubs. Surrounding the clutch levers is a clutch collar 22. This collar is slidable laterally and its inner face is slightly rounded transversely as shown so that it may readily coöperate with the outer inclined surfaces *o* of the clutch levers, lateral shift of the collar along these outer surfaces causing the clutch levers to be swung with their corresponding ends against the corresponding clutch hub, the inner surfaces *i* of the clutch arms being such that they will be parallel with the conical surface of the clutch hub when brought in contact therewith. After such contact, continued movement of the clutch collar outwardly along the outer surfaces *o* will introduce a powerful wedging action and will securely clamp the levers and hub together. When the clutch collar is in its outermost position the clutch hub and its associated driving wheel are securely connected to the driving shaft to be powerfully driven. When the clutch collar is shifted only to intermediate position the connection between the clutch hub and drive shaft will not be so secure and any degree of slip may be adjusted so that when the clamping force of the clutch levers is overcome there will be slippage and the mechanism protected.

Any suitable means may be provided for controlling the adjustment of the clutch collar 22. As shown, it is provided with a peripheral groove 23 for receiving shoes 24 and 25 supported from the ends of a yoke frame 26 which extends transversely of the drive shaft 5 and has pivot extensions 27 and 28 which have bearing in the bearing frames 29 and 30. A lever 31 extends from one of the extensions whereby the yoke frame may be readily swung to cause shifting of the clutch collar. By means of a set-screw 32 passing through the lever 31 and abutting against a bracket 33, the lever may be locked to hold the clutch collar in any adjusted position.

Normally the clutch collar 22 is in neutral position surrounding the pivot points of the clutch levers, and the springs 20 and 21 hold these levers in horizontal neutral position away from the clutch hubs 9 and 10. If it is desired to connect the wheel 12 with the drive shaft 5 the lever 31 is swung to shift the clutch collar toward this wheel and along the outer inclined faces *o* of the levers and as soon as these levers are pressed against the clutch hub 10 the wheel 12 will start to rotate and the maximum power transmitted from the drive shaft to the wheel will depend upon the degree of pressure exerted against the clutch collar and the resulting wedging engagement of the levers between the collar and the hub. If it is desired to bring the shaft 5 into driving relation with the wheel 11, the lever 31 is swung in the opposite direction to shift the clutch collar over the clutch levers to bring their ends against the clutch hub 9. The clutch levers of my improved arrangement act therefore as wedges whose outer and inner surfaces coöperate respectively with the clutch collar and the clutch hubs of the wheels to be driven. If the surfaces of these wedge levers incline gradually, then correspondingly gradual starting can be accomplished of the driving member and the driven member can be connected for different speeds relative to the drive shaft, each member being driven for a certain adjustment of the clutch collar until the wedging or clamping friction is overcome whereafter the parts will slip. My improved clutch is therefore very useful where machine or mechanism parts are to be gradually started or driven at various speeds, and where the machine or mechanism is apt to be suddenly interfered with or stopped, in which case the clutch elements will give and slip and the machine parts will be protected.

I do not desire to be limited to the exact construction and arrangement shown and described as changes and modifications are no doubt possible which would still come within the scope of the invention.

I claim as follows:

1. In clutch mechanism, the combination of a driving member, a member to be driven having a clutch hub against said driving member, wedge shaped clutch levers pivoted at their apexes to said driving member and extending therefrom to overlie said clutch hub, and a clutch collar surrounding said clutch levers and adapted to be shifted along said levers to clamp them into frictional engagement with said clutch hub whereby to connect said hub and said driving wheel.

2. In clutch mechanism, the combination with a driving member, of a clutch hub at each side thereof, clutch levers pivoted intermediate their ends on said driving member to swing in radial planes, the ends of said levers being of increasing radial thickness outwardly and overlying said clutch hubs, and a clutch collar surrounding said levers and adapted to be shifted laterally over the outer surfaces of said levers to swing said levers inwardly into clamping wedging engagement with the respective clutch hub to thereby connect such hub with the driving member.

3. In clutch mechanism, the combination of a rotatable driving member, of a frusto-conical clutch hub positioned with its base adjacent the end of said driving member, clutch levers pivoted to said driving member to swing in radial planes and being of increasing radial thickness outwardly and overlying said clutch hub, and a clutch collar adapted to be shifted along the outer surfaces of said levers to clamp said levers against said clutch hub thereby to connect said hub in driving relation with said driving member.

4. In clutch mechanism, the combination of a drive shaft, a clutch body secured to said shaft to rotate therewith, a member to be driven rotatable on said shaft and having a frusto-conical clutch hub extending therefrom with its base adjacent said clutch body, a plurality of clutch levers pivoted to said clutch body to swing in radial planes, said levers extending laterally to overlie said clutch hub and being of increasing radial thickness outwardly, a clutch collar surrounding said levers, and means for shifting said collar outwardly along said levers to clamp and wedge said levers between said collar and clutch hub to thereby transmit rotation of the driving member to the hub and member to be driven.

5. In clutch mechanism, the combination of a driving shaft, two members to be driven rotatable on said shaft, a clutch body secured to said shaft, clutch hubs extending from said members to be driven toward said clutch body, clutch levers pivoted intermediate their ends to the clutch body to rock in radial planes, said levers being of increasing radial thickness outwardly, a clutch collar surrounding said levers, and means for shifting said clutch collar laterally along the outer faces of said levers whereby to clamp and wedge said levers against the respective clutch hub and connect with the drive shaft the respective member to be driven.

6. In clutch mechanism, the combination of a drive shaft, wheels to be driven rotatable on said shaft, a clutch body secured to said shaft between said wheels, frusto-conical clutch hub extensions on said wheels having their ends of largest diameter adjacent the ends of said clutch body, clutch levers pivoted intermediate their ends to the clutch body to rock in radial planes, the ends of said levers overlying said clutch hubs and being of increasing radial thickness outwardly, a clutch collar normally surrounding said clutch levers at their pivots, and means for shifting said clutch collar laterally along the outer surfaces of the respective lever ends whereby such ends will be wedged between said clutch collar and respective clutch hub and the respective member to be driven connected with the drive shaft.

7. In clutch mechanism, the combination with a drive shaft, a clutch body secured to said shaft, a wheel to be driven rotatable on said shaft, a clutch hub extending from said wheel to said clutch body, clutch levers pivoted on said clutch body to rock in radial planes and extending laterally to overhang said clutch hub, said levers being of increasing radial width outwardly, springs tending to hold said levers away from said hub, and a clutch collar surrounding said levers and adapted to be shifted along their outer surfaces to swing them inwardly and clamp them against said clutch hub to thereby connect the hub with the drive shaft.

In witness whereof I hereunto subscribe my name this 19th day of April, A. D. 1918.

JOHN NEGRESCOU.

Copies of this patent may be obtained for five cents each, by addressing the "Commissioner of Patents, Washington, D. C."